Key to Fig. 2

INVENTORS:
ARTHUR E. CANFORA,
ANTHONY LIGUORI &
DOMINICK MANDATO, JR.
BY
Charles H. Brown
ATTORNEY

United States Patent Office 2,705,261
Patented Mar. 29, 1955

2,705,261

ELECTRONIC TELEGRAPH SIGNAL REDISTRIBUTORS

Arthur E. Canfora, Brooklyn, N. Y., Anthony Liguori, Hackensack, N. J., and Dominick Mandato, Jr., Mount Vernon, N. Y., assignors to Radio Corporation of America, a corporation of Delaware Application March 15, 1954, Serial No. 416,158

The terminal 15 years of the term of the patent to be granted has been disclaimed 11 Claims. (Cl. 178—70)

The invention relates to telegraph transmitting apparatus. It particularly pertains to such apparatus for redistributing the signal elements of a non-synchronous bistatic (two conditions) telegraph signal element pulse train to further telegraph transmitting apparatus on a synchronized basis.

Start-stop to multiplex telegraph extensors have been utilized in many systems where start-stop serial signals from initiating devices are applied to a multiplex telegraph system. The term extensor is applied to apparatus for placing telegraph signals in one form not readily acceptable by certain apparatus into a form which is readily acceptable. The arrangements known to the prior art for delivering signals on a synchronism basis to further apparatus under control of that apparatus are mainly mechanical in nature and therefore are subject to the normal wear that is present in mechanical apparatus. Furthermore, mechanical apparatus often requires to a greater extent regulation and adjustment than the desirable electronic apparatus. Also, the operating speed and accuracy of mechanical apparatus is limited by weight and inertia, whereas in electronic apparatus there are practically no limitations insofar as telegraph speeds up to 1000 words per minute are concerned.

There are forms of electronic simultaneous-to-serial and serial-to-separate extensors. A "separate" signal is construed hereinafter to mean an $n$-element signal appearing over $n$ separate circuits with the elements presented simultaneously or sequentially element after element. An $n$-element simultaneous signal is construed to be one in which $n$ signal elements appear simultaneously on $n$ separate circuits, and a sequential $n$ element signal is construed to be one in which $n$ elements appear on $n$ separate circuits element after element. A "serial" signal is construed to means an $n$-element signal appearing element after element over a single circuit.

These prior art extensors comprise generally a normally quiescent start-stop oscillator which controls an electronic distributor, usually of the counting chain type. The oscillator is under the influence of received telegraph signals or operate pulse signals, and means are also provided to prevent the operation of the extensor if an abnormal line condition is set up. In these prior art arrangements, incoming start-stop signals are stored in a plurality of selector tubes equal in number to the number of signal elements of the code being utilized. Signal transfer means under the influence of the associated multiplex distributor transfers the signals from the selector tubes to a plurality of storage tubes from which the signals are fed to the transmitting multiplex distributor. Such arrangements are expensive in initial cost, bulky in size and require considerable maintenance and servicing.

Accordingly, an object of the invention is to provide an improved electronic circuit arrangement for redistributing the pulses of a non-synchronous serial signal on a synchronous basis without requiring that the source of non-synchronous signal be under the direct control of the redistributing apparatus and without requiring any signal element storage.

Another object of the invention is to provide an all-electronic serial-to-serial signal element redistributor which is low in initial cost and which requires less readjustment than piror art arrangements.

A further object of the invention is to provide an electronic redistributor having a minimum number of components operating during idling periods.

Still another object of the invention is to provide an electronic redistributor which does not depend on any form of start-stop oscillator.

Another object is to regenerate a non-synchronous variable signal obtained from a transmitter-distributor into a synchronous signal for application to multiplex transmitting terminal apparatus.

The foregoing objects of the invention, and others as they may appear, are obtained in an electronic circuit arrangement wherein non-synchronous serial signals from a transmitting distributor or other source are applied to a signal element regenerator circuit which is operable under the influence of a timing wave generator responding to synchronizing operate pulses obtained from the apparatus to which the synchronized output serial signal is to be applied. The synchronizing pulses are gated to the timing wave generator in a circuit which responds to the signals applied to the regenerator circuit. The circuitry of the timing wave generator is arranged to produce a timing wave effective to count by a factor equal to the number of signal elements of each code character as received and prevent the timing wave generator from responding to any further incoming synchronizing pulses until a succeeding signal code character is received.

According to the invention provision is made to insure that the nature of the output of the regenerator circuit is in exact response to the nature of the signal input. For long periods of signal input of one static nature, usually solid marking, this is accomplished by means of a delay and switching circuit responsive to the input signals which trigger the regenerator circuit in the proper condition to provide the steady output of signal of the same nature.

In order that the invention may be clearly understood and readily put to practical use, a circuit arrangement embodying the invention is hereinafter described, by way of example only, with reference to the accompanying drawing forming a part of the specification and in which.

Figure 1:
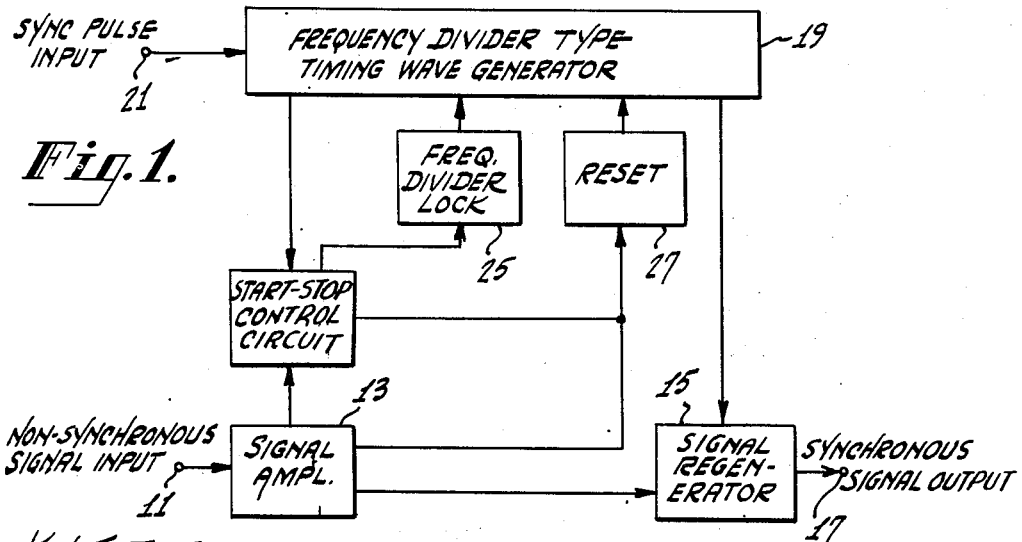
Fig. 1 is a functional diagram of a signal redistributor according to the invention.

Referring to Fig. 1 there is shown a functional diagram of a signal redistributor circuit arrangement according to the invention. A non-synchronous signal element pulse train, which is preferably or usually obtained from a known transmitter distributor, is applied to signal input terminals 11 for application to a signal input circuit, preferably a signal amplifier 13. The transmitter-distributor usually is operable in response to a paper tape having holes punched therein in accordance with the intelligence to be transmitted. The signal regenerator 15 is coupled to the signal amplifier 13 and arranged to produce a synchronous signal element pulse train at the output terminals 17, under the control of the signal element train obtained from the output of the signal amplifier 13 and timing waves obtained from the timing wave generator 19. The timing wave generaor 19 is arranged to supply the signal regenerator 15 with timing waves which are in synchronism with the utilization apparatus coupled to the output terminals 17. This is accomplished by taking synchronizing or operate pulses from the utilization apparatus not shown but coupled to terminal 17 and responsive to pulses on this

wave generating portion. The tubes V3A—V6B are reset to an initial condition through the reset circuitry 27 comprising a normally blocked reset tube V11B having the anode connected to the cathodes of the tubes V3A, V4A, V5B and V6A. The grid of the tube V11B is connected by means of a neon lamp N2 and a resistor R76 to the anodes of the signal amplifier tube V7A and of the tube V8A of the gating control circuit 23. When the tube V8A is blocked the anode rises to a relatively high potential. The seventh signal element of the five-unit code is marking and under this condition the anode of the signal amplifier tube V7A is highly positive. Therefore, the connection between the anodes of the tubes V7A and V8A through the resistors R62 and R76 to the neon lamp N2 applies a highly positive potential ultimately igniting the neon lamp N2 and the positive pulse developed across a resistor R75 in the grid circuit of the tube V11B renders the reset tube V11B conducting. The negative going transition at the anode resulting is applied to the cathodes of the tubes V3A, V4A, V5B and V6A causing these tubes and the reciproconductive circuits in which they are located to be reset to the initial condition. A short time delay due to the integration of potential in the capacitor C34 to the cutoff value of the reset tube V11B insures the binary tubes have completed their functioning prior to reset. It should be noted that in the arrangement as shown the reciproconductive circuits 34 and 35 actually need not be reset, but the connections are made in the interest of flexibility and reliability since some malfunctioning might occur that would require resetting these circuits.

The capacitor C34, the resistor R75 and the neon lamp N2 are connected in a well-known relaxation type oscillator circuit which causes the reset tube V11B to be pulsed periodically. If solid spacing signals should be applied to the signal input terminals 11' the connection of the resistor R62 serves to disable the reset circuit 27 by reducing the voltage across the neon lamp N2 below the striking potential to permit control of the timing wave generator 19 by the synchronizing or operate pulses without interference from the reset circuit.

Figure 3:
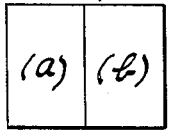
Fig. 3 is a graphical representation of waveforms appearing at various portions of the circuit shown in Fig. 2.
Figure 3:
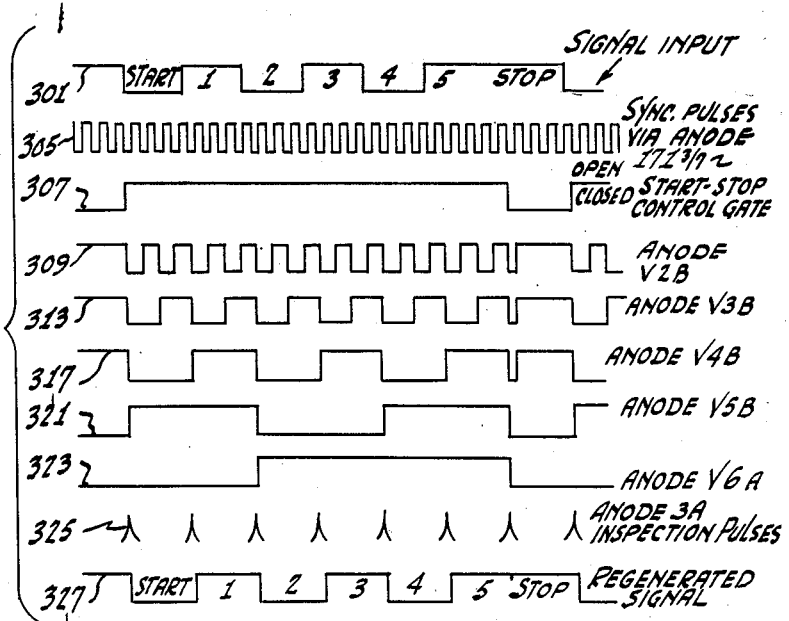

At the start of each marking element approximately −20 volts is developed across the input grid resistor R2 and the signal amplifier tube V7A anode becomes highly positive. Two resistors R59 and R61 form a voltage divider in the grid of the signal thresholding tube V7B such that when the anode of the binary tube V3A is highly positive, a positive transition obtained from the anode of the tube V3A by way of a resistor R60 and a capacitor C33 is of sufficient amplitude to cause the tube V7B to conduct, and cut off the signal regenerator output tube V9B of the lockover reciproconductive circuit forming the signal regenerator 15, causing the companion tube V9A to conduct. Curve 325 of Fig. 3 graphically represents these pulses. Simultaneously a negative transition from the anode of the binary tube V3B is applied to the cathode of the tube V9B through the resistor R71 and the capacitor C32 to a diode D1 to ground. When the signal element is mark, the positive transition predominates. When the regenerator tube V9A conducts, its grid is essentially at ground potential and since the grid of the output signal amplifier tube V1B is connected to the grid of the regenerator tube V9A through the resistor R68, the output amplifier tube V1B conducts. When the tube V1B conducts its anode voltage is low positive. When the output coupling resistor R74 is terminated with a 10,000 ohm load resistor across the output signal terminals 17', the neon N3 is extinguished and approximately −20 volts is developed across the terminals 17' which represents the marking condition to the utilization apparatus.

On the regeneration of a space element, the anode of the signal amplifier tube V7A goes negative, and the voltage divider formed by the resistor R59 and the resistor R61 to the grid of the following tube V7B is sufficiently negative to render the positive transition from the anode of the binary tube V3A ineffective to change the state of conduction of the regenerator tube V9A. However, the negative transition from the anode of the tube V3B is of sufficient negative amplitude to cause the other regenerator tube V9B to conduct. The tube V9A becomes cut off and since its grid is highly negative and connected to the grid of the output signal amplifier tube V1B, the tube V1B is blocked. When the output tube V1B is blocked, the anode is highly positive, causing the neon lamp N3 to ignite, and when the resistor R74 is terminated with a 10,000 ohm load resistor across the terminals 17', approximately plus 4 volts is developed across the load, which represents the spacing condition. Obviously, regenerated output signal elements can be taken in either sense from the anodes of the regenerator tubes V9A and V9B and utilized in any conventional manner if desired. The regenerated output signal is represented by the curve 327 of Fig. 3 with elements 1, 3, 5 marking.

Provision is made to insure a "steady mark" output for "steady mark" input and is accomplished by the circuit comprising two resistors R51, R63, two capacitors C25, C26 and a neon lamp N1. Assuming that the signal is in a marking condition, and after power was applied to the redistributor the output signal regenerator 15 has stabilized with the regenerator tube V9B conducting and the reciprocal tube V9A blocked, and gating control circuit has stabilized with the tube V8B conducting and the companion tube V8A blocked, keeping the tube V2A clamped. As explained previously, this would result in a solid "spacing" output condition. Since the anode of the tube V8A is highly positive and the anode of the tube V9A is highly positive, the neon lamp N1 will ignite after the integrating capacitor C26 reaches the firing point and a negative-going voltage will be developed, which voltage is applied through the capacitors C25, C27 and a resistor R54, to the grid of the tube V8B, causing tube V8B to become non-conducting. When this occurs the timing wave generator 19 is free to run, the signal regenerator 15 regenerates a continuous mark, and after the count of seven is completed, the regenerator 15 is stabilized in the marking condition.

Figure 2:
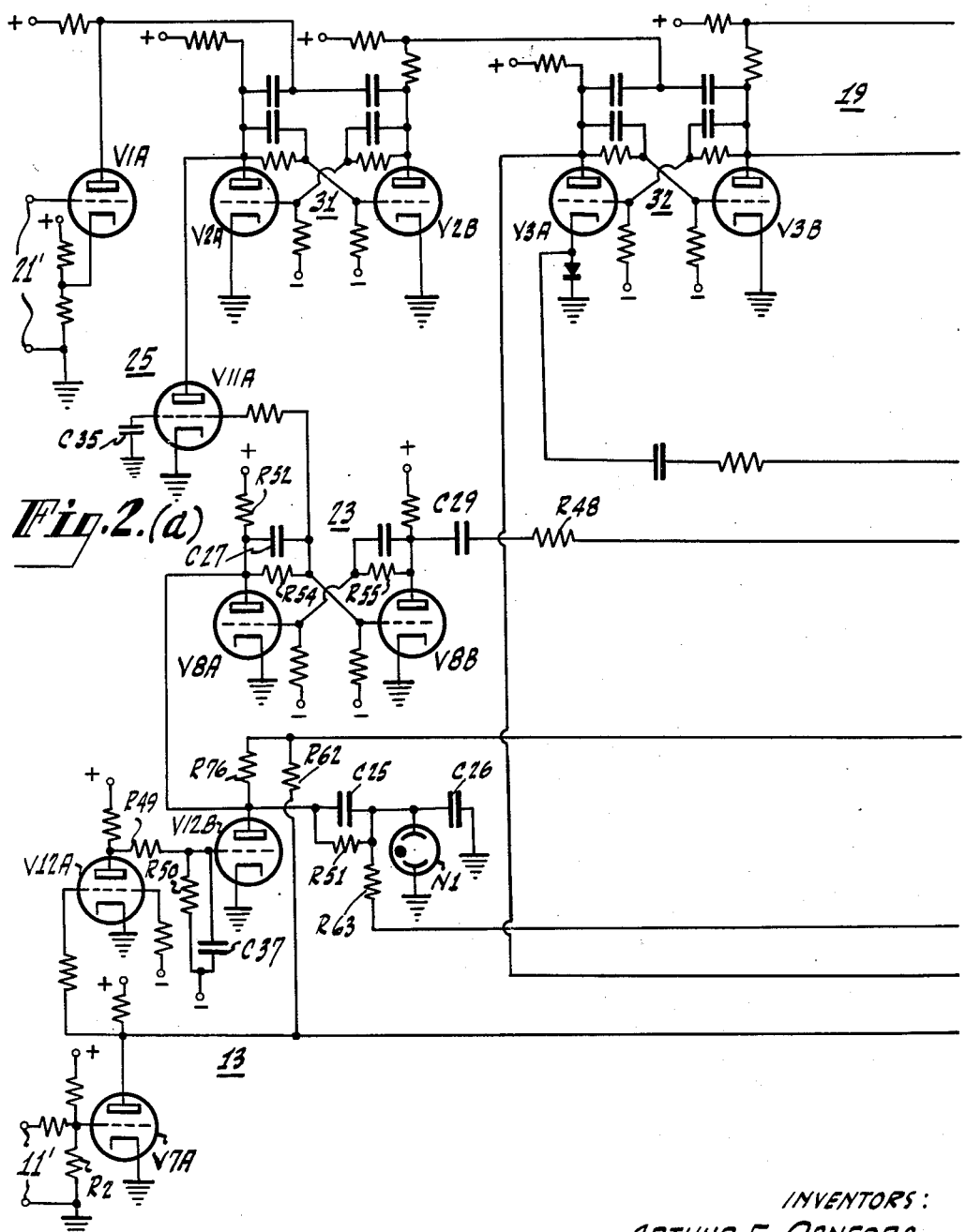
Fig. 2 is a schematic diagram of an embodiment of the invention according to the functional diagram of Fig. 1.
Figure 2:
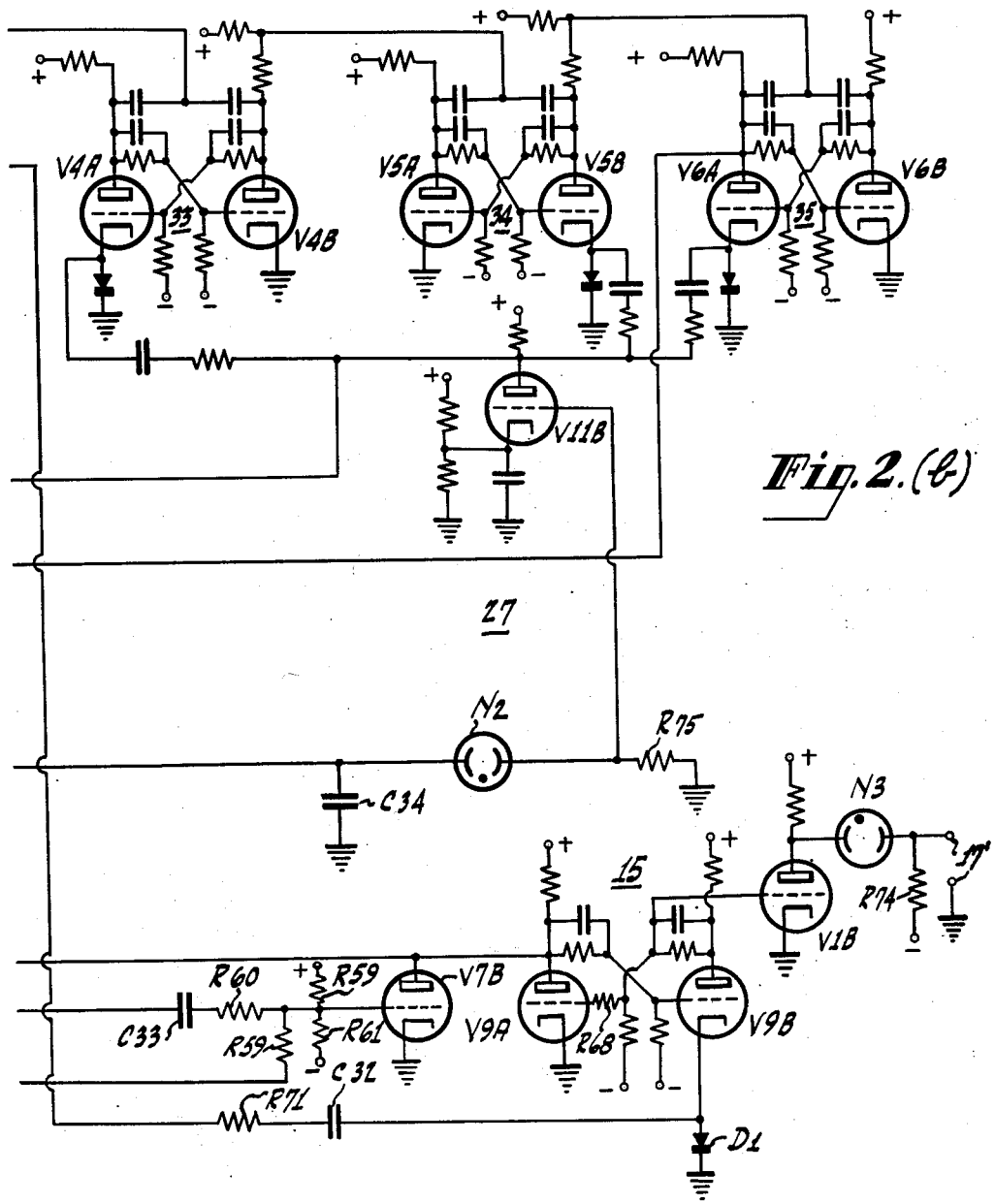

In a model of the arrangement shown in Fig. 2, constructed and tested on the basis of 42 6/7 baud rate, with a synchronizing pulse rate of 171 3/7 the following component parts values were used:

Tubes

| Ref. No.: | Type |
|---|---|
| V1A—V9B | ½ 5963 or 6SN7 |
| V11A—V12B | ½ 5963 or 6SN7 |

Diodes

| Ref. No.: | Type |
|---|---|
| D1 and all others | 1N34A |

Capacitors

| Ref. No.: | Value, mfd. |
|---|---|
| C25 | 0.00025 |
| C26 | 0.001 |
| C29 | 0.0005 |
| C32 | 0.0005 |
| C33 | 0.002 |
| C34 | 0.006 |
| C35 | 0.00025 |
| C36 | 0.1 |
| C37 | 0.006 |

Resistors

| Ref. No.: | Value |
|---|---|
| R2 | 300 ohms—input grid. |
| R48 | 100 kilohms. |
| R49 | 1 megohm. |
| R50 | 1.8 megohms. |
| R51 | 4 megohms. |
| R54 | 1 megohms. |
| R55 | 1 megohms. |
| R59 | 1 megohms. |
| R60 | 100 kilohms. |
| R61 | 680 kilohms. |
| R62 | 4 megohms. |
| R63 | 4 megohms. |
| R68 | 150 kilohms. |
| R71 | 330 kilohms. |
| R74 | 82 kilohms. |
| R75 | 56 kilohms. |
| R76 | 4 megohms. |

Two power supplies delivering 150 volts D. C. were used. One power supply was connected between the terminals marked plus and a neutral point indicated by the ground symbol and the other supply was connected between the neutral point and the terminals marked (−) with the minus sign.

As expected overspeeding of the transmitter distributor with respect to the redistributor merely shortened the water so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 cm.³ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

said timing wave generating chain and a control element coupled to said lockover reciproconductive circuit to reset said timing wave generating chain to a prearranged initial condition in response to activation of said subsequent stage, and means to apply a train of operate pulses to the input circuit of said timing wave generating chain, thereby to effect regeneration of the signal applied to said signal input circuit at the output of said bistable reciproconductive circuit in synchronism with said train of operate pulses.

References Cited in the file of this patent

UNITED STATES PATENTS

| | | |
|---|---|---|
| 2,454,089 | Rea et al. | Nov. 16, 1948 |
| 2,612,562 | Baker | Sept. 30, 1952 |
| 2,687,451 | Slayton | Aug. 24, 1954 |